UNITED STATES PATENT OFFICE.

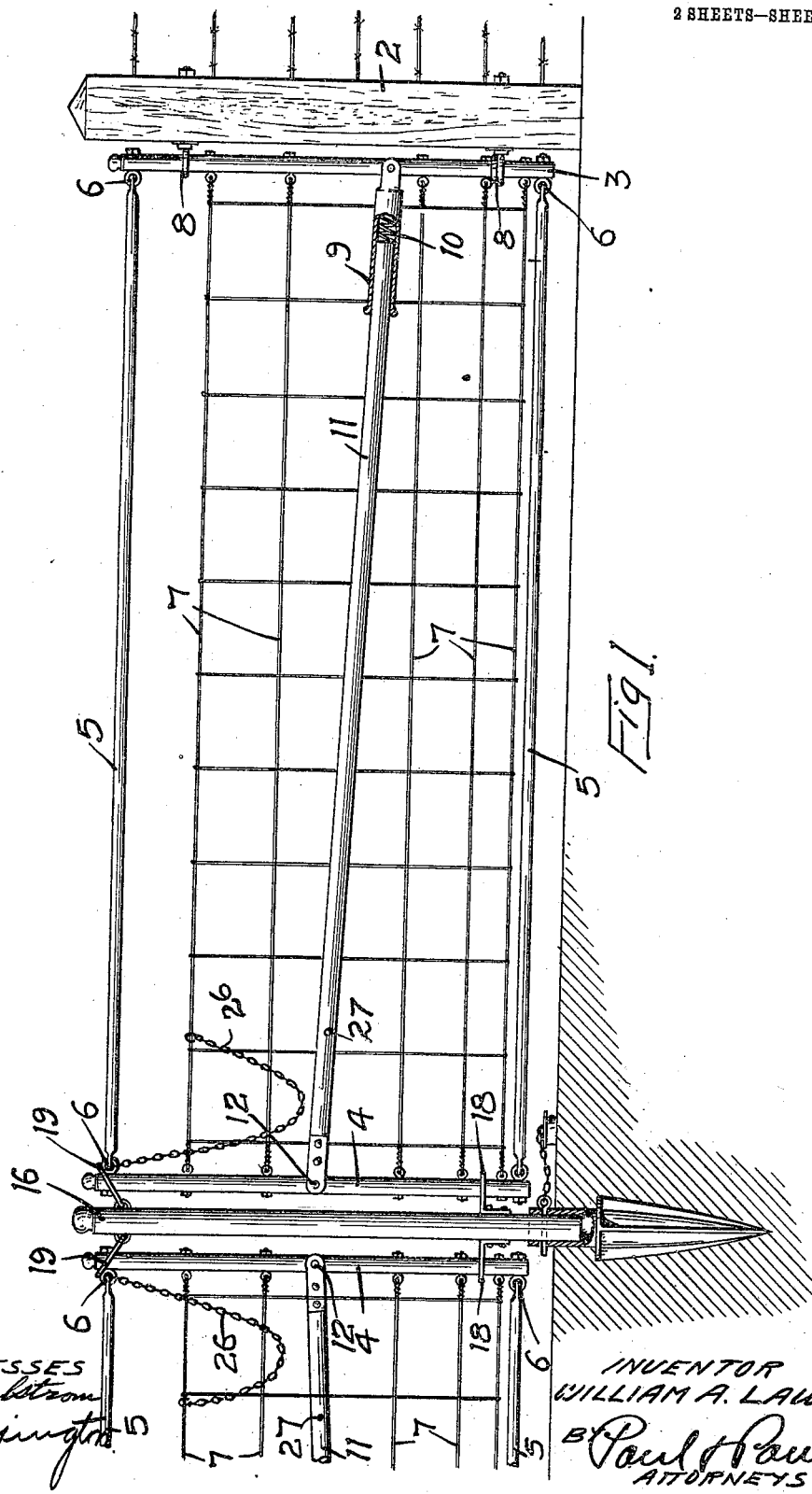

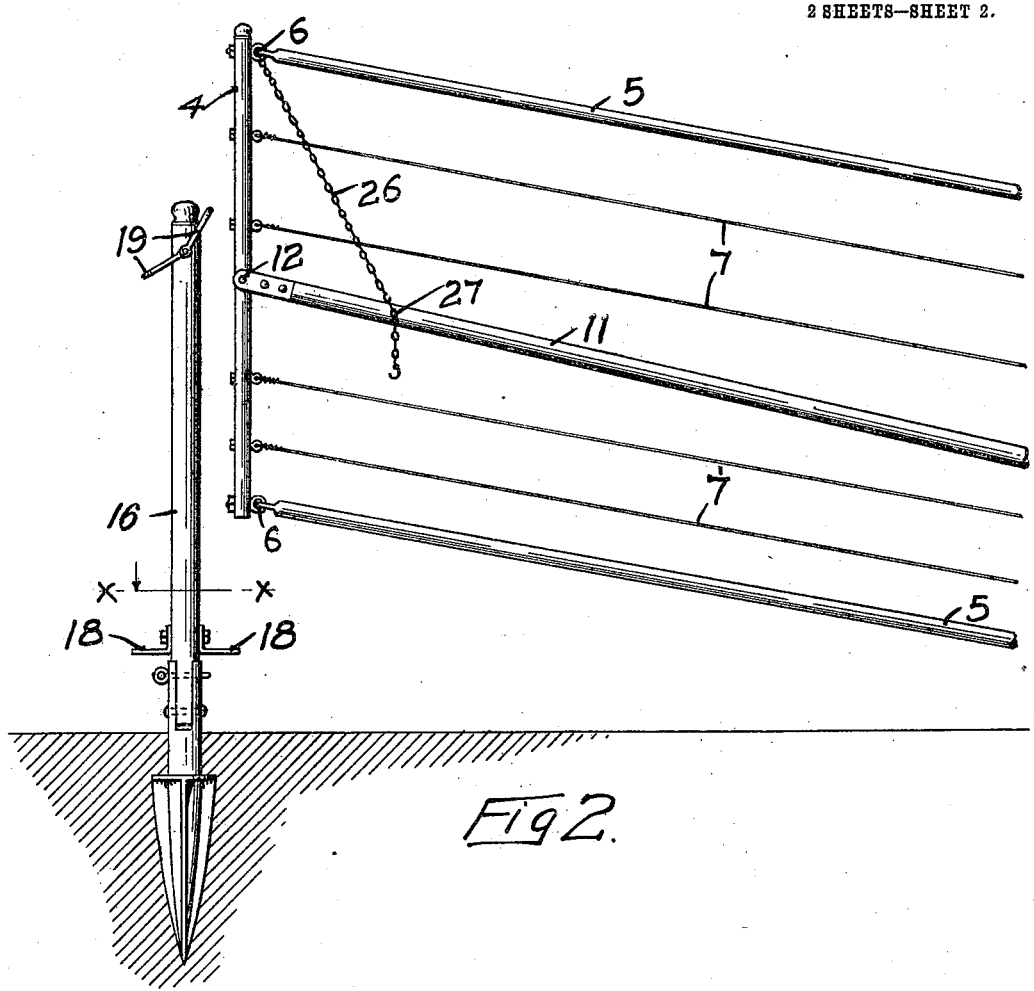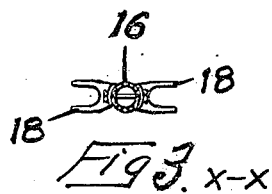

WILLIAM A. LAW, OF ST. PAUL, MINNESOTA.

GATE.

960,351.  Specification of Letters Patent.  Patented June 7, 1910.

Application filed July 12, 1909. Serial No. 507,228.

*To all whom it may concern:*

Be it known that I, WILLIAM A. LAW, of St. Paul, Ramsey county, Minnesota, have invented certain new and useful Improvements in Gates, of which the following is a specification.

My invention relates to gates adapted particularly for closing road ways on a farm or country road and the object of the invention is to provide a gate having a top rail, which will be plainly visible to cattle or horses, and at the same time, will permit swaying or twisting of the gate when open and under pressure, as when struck by the animals passing through the gate way, without damaging the gate.

A further object is to provide a gate of simple durable construction and one which can be easily set up or taken down.

My invention consists generally in various constructions and combinations, all as hereinafter described and particularly pointed out in the claims.

In the accompanying drawings, forming part of this specification, Figure 1 is a side view, partially in section, of a gate embodying my invention, Fig. 2 is a view illustrating the gate when released from the post and ready to be swung to an open position, Fig. 3 is a sectional view on the line $x$—$x$ of Fig. 2.

In the drawing, 2 represents a fence post whereon the gate is hung. The gate consists of end bars 3 and 4 connected with one another at the top and bottom by tubular rails 5, the ends of which are swiveled at 6 to the bars 3 and 4. Wires 7 have their ends swiveled to the bars 3 and 4 and the bar 4 is hinged at 8 on the post 2. The rails 5 are sufficiently large in cross section to enable an animal to see them plainly and avoid running into the gate, and the swiveled ends of these rails and the flexible character of the wire 7 allows the gate to sway or twist on its hinges when in an open position without damage to the gate. This swaying or twisting of the gate is likely to occur when struck by the animals passing through the gate at which time a gate having bars with ordinary rigid connections between them would be broken or damaged. Some times a gate is struck by a wagon or the load thereon and the type of gate I have shown herein will allow its free end to sway without damage to the gate or its hinges.

The gate bar 3 has a cylinder 9 pivoted at one end on the bar and provided with a spring 10, which is arranged to bear on the end of a plunger bar 11, which is pivotally connected at 12 to the opposite bar 4. The tension of this spring tends to push the plunger out of the cylinder and raise the bar 4 above the level of the other bar so that in opening the gate, its free end will swing over any obstruction, such as snow, which may have accumulated in the drive way. This spring-actuated mechanism for lifting the free end of the gate I make no claim to in this application, as it is already covered by Letters Patent of the United States.

The hinge connection of the rails 5 and the wires 7 with the bars 3 and 4 allows the free vertical movement of the bar 4, actuated by the spring 10 as soon as the bar is released, and in its working or closed position, the bar 4 is drawn down until the rails are substantially horizontal and the spring is put under tension to lift the gate as soon as it is released.

The post 16 has a fork 18 on each side to straddle the bar 4, and links 19 at its upper end, which slip over the upper ends of the bars 4 and hold the gates in their closed position and at the same time, prevent them from swinging upwardly under the tension of the spring 10 while in such closed position. As soon as these links are disengaged from the bars, the gates will swing upward to the position indicated in Fig. 2, when the gate may be pushed open, its raised free end clearing any obstruction in the drive way.

Each gate is provided with a chain 26 attached to the top of the bar 4 and adapted to engage the pin 27 on the plunger bar 11, thereby limiting the upward swinging movement of the gate. This chain may also be utilized to draw the gate down to a horizontal position or to the ground line and secure it when the gate is open.

I claim as my invention:

1. A gate comprising end bars, means connecting said bars with one another at intervals, the connection between said bars at the top of the gate being rigid and inflexible and having swiveled connections at its ends with said bars, for the purpose specified.

2. A gate composed of end bars and means connecting them at intervals with one another, a tubular rail non-yielding lengthwise provided between the upper ends of said bars, and swivels connecting the ends of said rail with said bars.

3. A gate comprising end bars, tubular rails between the top and bottom ends of said bars and having swiveled connections therewith, and wires between said bars at intervals, and also having a swiveled connection therewith, and said tubular rails being visible at a distance and permitting the swaying or oscillation of the gate when pressure is applied to one side thereof.

4. A gate comprising end bars, means connecting said bars with one another at intervals, the connection between said bars at the top of the gate consisting of an inflexible rail having a flexible joint said rail being non-yielding lengthwise.

In witness whereof, I have hereunto set my hand this 30th day of June 1909.

WILLIAM A. LAW.

Witnesses:
J. M. SULLIVAN,
J. A. BYINGTON.